(12) United States Patent
O'Donnell et al.

(10) Patent No.: US 11,074,602 B2
(45) Date of Patent: Jul. 27, 2021

(54) METHOD AND SYSTEM FOR CARD LINK FILTERING

(71) Applicant: MasterCard International Incorporated, Purchase, NY (US)

(72) Inventors: Gerard Joseph O'Donnell, St. Peters, MO (US); Jensen James E. Pastrana, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 366 days.

(21) Appl. No.: 14/055,230

(22) Filed: Oct. 16, 2013

(65) Prior Publication Data
US 2015/0106173 A1 Apr. 16, 2015

(51) Int. Cl.
*G06Q 30/02* (2012.01)

(52) U.S. Cl.
CPC .............................. *G06Q 30/0207* (2013.01)

(58) Field of Classification Search
CPC .... G06Q 30/02; G06Q 30/0601; G06Q 30/06; G06Q 20/12; G06Q 20/20; G06Q 20/385; G06Q 50/01; G06Q 20/3224; G06Q 20/40; G06Q 20/10; G06Q 30/08; G06Q 20/3276; G06Q 20/3278; G06Q 30/0267; G06Q 20/405; G06Q 20/4016; G06Q 30/0633; G06Q 30/0261; G06Q 20/34; G06Q 20/382; G06Q 30/0207–0277; H04N 21/25891; H04N 21/4312; H04N 21/47202;

(Continued)

(56) References Cited

U.S. PATENT DOCUMENTS

2009/0216646 A1 8/2009 Seven et al.
2010/0161444 A1 6/2010 Roever et al.
(Continued)

OTHER PUBLICATIONS

International Search Report dated Jan. 26, 2015 in corresponding PCT Application No. PCT/US2014/060574 filed on Oct. 15, 2014 (12 pages).

(Continued)

*Primary Examiner* — Chinyere Mpamugo
(74) *Attorney, Agent, or Firm* — Buchanan Ingersoll & Rooney PC

(57) ABSTRACT

A method for providing transaction details for payment transactions indicative of offer redemption includes: receiving an offer listing including at least one merchant offer entry, wherein each entry includes an offer identifier and an indication of a valid merchant with which a corresponding offer for goods or services may be redeemed; receiving an offer linking notification including a consumer identifier and an indication of a selection of an offer corresponding to a specific merchant offer entry by a consumer associated with the consumer identifier; identifying a merchant identifier, wherein the merchant identifier corresponds to the valid merchant indicated in the specific merchant offer entry; storing a transaction processing rule, the rule including the identified merchant identifier and the consumer identifier; and transmitting transaction details for a payment transaction included in an authorization request, wherein the authorization request further includes at least the identified merchant identifier and the consumer identifier.

16 Claims, 10 Drawing Sheets

(58) Field of Classification Search
CPC ............. H04N 21/482; H04N 21/4821; H04N 21/6125; H04N 21/84; H04N 21/4627; H04N 21/2541; H04N 21/858; H04N 21/2547; H04N 21/42204; H04N 21/4722; H04N 21/812; H04N 7/17318; H04N 21/2393; H04N 21/2743; H04N 21/4314; H04N 21/44222; H04N 21/6175; H04N 21/64322; H04N 21/4122; H04N 21/4532; H04N 21/4753; H04N 21/2221; H04N 21/234309; H04N 21/235; H04N 21/2353; H04N 21/25858; H04N 21/26225; H04N 21/4383; H04N 21/6118
See application file for complete search history.

(56) References Cited

U.S. PATENT DOCUMENTS

| | | |
|---|---|---|
| 2012/0035997 A1 | 2/2012 | Burgess et al. |
| 2012/0253852 A1* | 10/2012 | Pourfallah et al. ............... 705/4 |
| 2012/0303431 A1 | 11/2012 | Phillips et al. |
| 2012/0323663 A1* | 12/2012 | Leach ................ G06Q 30/0239 705/14.25 |
| 2013/0197991 A1* | 8/2013 | Basu .................... G06Q 20/102 705/14.39 |
| 2013/0226684 A1 | 8/2013 | Hammad et al. |
| 2014/0278905 A1* | 9/2014 | DeNardis ............... G06Q 30/02 705/14.38 |

OTHER PUBLICATIONS

Office Action (Patent Examination Report No. 1) dated Oct. 26, 2016, by the Australian Patent Office in corresponding Australian Application No. 2014337530. (3 pages).

Written Opinion issued by the Intellectual Property Office of Singapore dated Dec. 27, 2016 in corresponding Singapore Application No. 11201603015Q (7 pages).

Written Opinion issued by the Intellectual Property Office of Singapore dated Aug. 4, 2017 in corresponding Singapore Application No. 11201603015Q (7 pages).

European Examination Report dated Dec. 7, 2017, issued in corresponding European Patent Application 14 853 710.3-1958 (6 pages).

* cited by examiner

METHOD AND SYSTEM FOR CARD LINK FILTERING

FIELD

The present disclosure relates to the providing of transaction details for transactions indicative of offer redemption, specifically the use of payment card linking and filtering techniques to provide filtered transaction data to an entity for payment transactions indicative of including a redeemed offer.

BACKGROUND

In an effort to increase consumer traffic, merchants often provide offers (e.g., deals, discounts, coupons, etc.) to consumers designed to attract consumers to their store, be it a physical location, an Internet website, etc., and to encourage consumers to spend with the hope that the consumer will purchase goods or services in addition to goods or services associated with the offer. More recently, third party offer providers have gained success by operating as a middleman in the traditional offer structure. Such offer providers may purchase offers from a merchant to resell to consumers. The merchant may gain the benefit of increased business and immediate revenue without the need to market or advertise, while the offer provider may gain profit with each offer that is resold to consumers.

While such arrangements may provide economic benefit to both merchants and offer providers, it may be difficult for merchants and offer providers to keep track of the redemption of offers that have been purchased by consumers. In many instances, such as when a consumer that has purchased an offer from an offer provider may transact with a merchant a number of times without the use of the purchase offer, or when a large number of consumers transaction with the merchant and redeem purchased offers, it may be difficult for the merchant and/or the offer provider to identify which consumer or consumers have redeemed purchased offers and when.

Thus, there is a need for a technical solution to provide for accurate and efficient identification of offers redeemed by a consumer.

SUMMARY

The present disclosure provides a description of systems and methods for providing transaction details for payment transactions indicative of offer redemption.

A method for providing transaction details for payment transactions indicative of offer redemption includes: receiving, by a receiving device, an offer listing including at least one merchant offer entry, wherein each merchant offer entry includes at least an offer identifier and an indication of a valid merchant with which a corresponding offer for goods or services may be redeemed; receiving, by the receiving device, an offer linking notification including at least a consumer identifier and an indication of a selection of an offer corresponding to a specific merchant offer entry of the at least one merchant offer entry by a consumer associated with the consumer identifier; identifying, by a processing device, a merchant identifier, wherein the merchant identifier corresponds to the valid merchant indicated in the specific merchant offer entry; storing, in a database, a transaction processing rule, wherein the transaction processing rule includes at least the identified merchant identifier and the consumer identifier; and transmitting, by a transmitting device, transaction details for a payment transaction included in an authorization request, wherein the authorization request further includes at least the identified merchant identifier and the consumer identifier.

Another method for providing transaction details for payment transactions indicative of offer redemption includes: receiving, by a receiving device, an authorization request for a payment transaction, wherein the authorization request includes at least a merchant identifier, a consumer identifier, and transaction details; identifying, in a database, a specific transaction processing rule of a plurality of transaction processing rules, wherein the specific transaction processing rule includes at least the merchant identifier, the consumer identifier, destination information, and at least one filtering rule; filtering, based on the at least one filtering rule, the transaction details included in the authorization request; and transmitting, by a transmitting device, the filtered transaction details to an offer provider based on the destination information included in the specific transaction processing rule.

A system for providing transaction details for payment transactions indicative of offer redemption includes a database, a receiving device, a processing device, and a transmitting device. The receiving device is configured to: receive an offer listing including at least one merchant offer entry, wherein each merchant offer entry includes at least an offer identifier and an indication of a valid merchant with which a corresponding offer for goods or services may be redeemed; and receive an offer linking notification including at least a consumer identifier and an indication of a selection of an offer corresponding to a specific merchant offer entry of the at least one merchant offer entry by a consumer associated with the consumer identifier. The processing device is configured to: identify a merchant identifier, wherein the merchant identifier corresponds to the valid merchant indicated in the specific merchant offer entry; and store, in the database, a transaction processing rule, wherein the transaction processing rule includes at least the identified merchant identifier and the consumer identifier. The transmitting device is configured to transmit transaction details for a payment transaction included in an authorization request, wherein the authorization request further includes at least the identified merchant identifier and the consumer identifier.

Another system for providing transaction details for payment transactions indicative of offer redemption includes a database, a receiving device, a processing device, and a transmitting device. The receiving device is configured to receive an authorization request for a payment transaction, wherein the authorization request includes at least a merchant identifier, a consumer identifier, and transaction details. The processing device is configured to: identifying, in the database, a specific transaction processing rule of a plurality of transaction processing rules, wherein the specific transaction processing rule includes at least the merchant identifier, the consumer identifier, destination information, and at least one filtering rule; and filter, based on the at least one filtering rule, the transaction details included in the authorization request. The transmitting device is configured to transmit the filtered transaction details to an offer provider based on the destination information included in the specific transaction processing rule.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
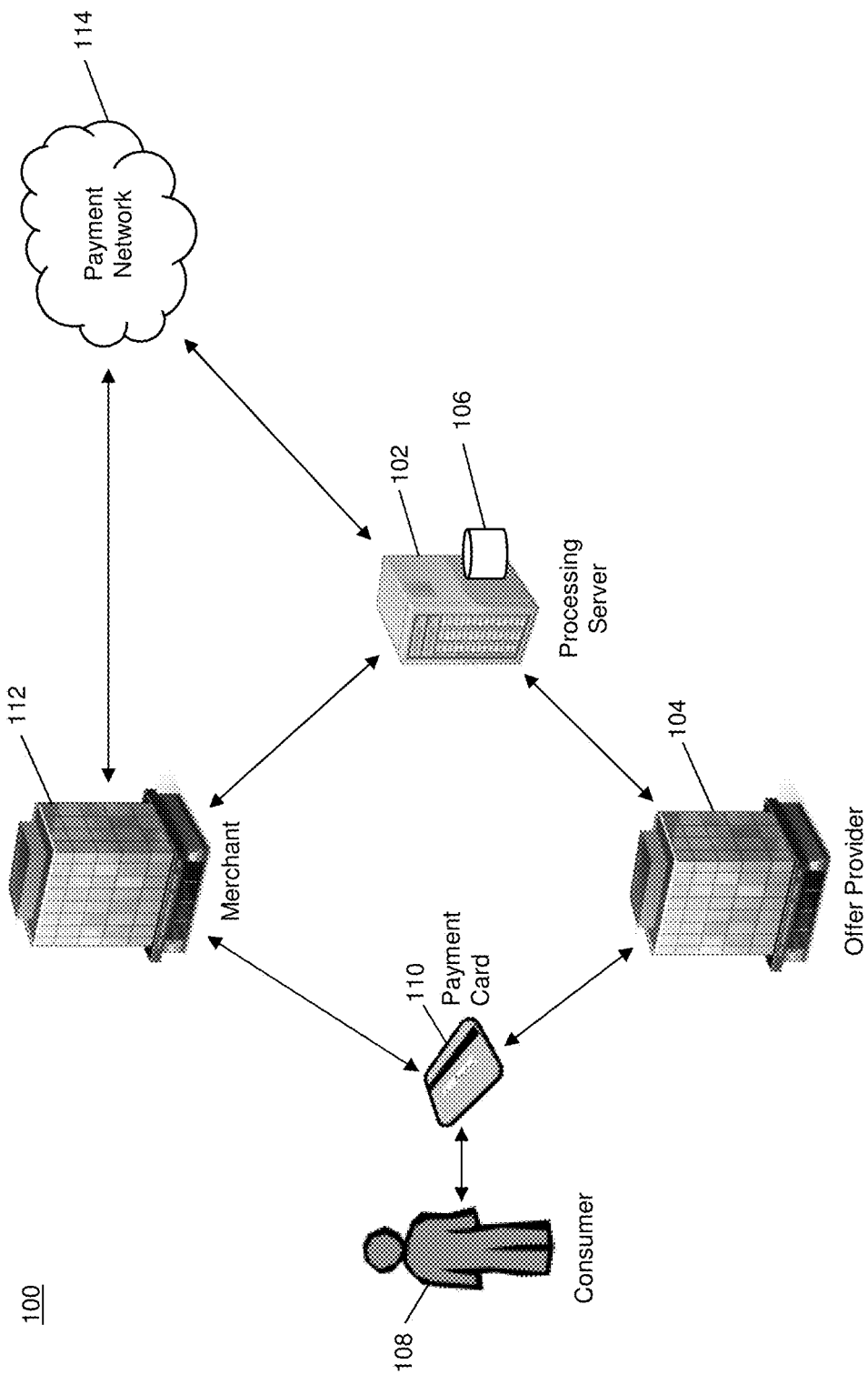
FIG. 1 is a high level architecture illustrating a system for the providing of transaction details for payment transactions indicative of offer redemption in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for Providing Transaction Details Indicative of Offer Redemption

FIG. 1 illustrates a system 100 for the providing of transaction details for a payment transaction indicative of offer redemption.

The system 100 may include an offer provider 104. The offer provider 104 may provide one or more offers to consumers for redemption at one or more merchants. The offer provider 104 may transmit an offer listing including at least one merchant offer entry to a processing server 102. The processing server 102, discussed in more detail below, may store the received merchant offer entries in a database 106. Each merchant offer entry may include data related to an offer for the purchase of goods or services and may be related to a merchant 112 with whom the related offer may be redeemed.

The system 100 may also include a consumer 108. The consumer 108 may be associated with a payment card 110, which may be associated with a payment account corresponding to the consumer 108. The payment card 110 may be issued to the consumer 108 by an issuing bank that owns and/or operates the associated payment account.

The consumer 108 may purchase and/or obtain an offer for the purchase of goods or services from the offer provider 104. In some instances, the offer provider 104 may identify a plurality of available offers for use by the consumer 108. In other instances, the offer provider 104 may provide a plurality of available offers for selection by the consumer 108 in order to be eligible for redemption. The consumer 108 may select an offer using methods that will be apparent to persons having skill in the relevant art, such as a computing device (e.g., via the Internet, an application program, etc.) or an in-person transaction. As part of the selection of the offer, the consumer 108 may provide payment details for the payment card 110 to the offer provider. In one embodiment, the consumer 108 may purchase the offer from the offer provider 104 using the payment card 110. In such an embodiment, the offer provider 104 may capture the payment details when initiating the payment transaction.

The offer provider 104 may transmit an offer linking notification to the processing server 102. The offer linking notification may indicate the offer selected by the consumer 108 and may include the payment details of the payment card 110. The processing server 102 may identify a merchant offer entry corresponding to the selected offer and identify a merchant identifier corresponding to the merchant 112 with whom the selected offer may be redeemed. The processing server 102 may then create a transaction processing rule, which may be stored in one or more of the databases 106.

The transaction processing rule may include the merchant identifier corresponding to the merchant 112 and a consumer identifier corresponding to the consumer 108. In one embodiment, the consumer identifier may be a payment account number or other data associated with the payment card 110. The consumer 108 may use the payment card 110 at the merchant 112 to fund a payment transaction involving the merchant 112 and the consumer 108. The merchant 112 may conduct the payment transaction, which may be processed by a payment network 114 using systems and methods discussed herein and as will be apparent to persons having skill in the relevant art.

The payment network 114 may transmit transaction data related to the payment transaction to the processing server 102. In some embodiments, the payment network 114 may transmit a copy of the authorization request for the payment transaction received by the payment network 114 to the processing server 102. In some instances, the processing server 102 may be part of the payment network 114. In one embodiment, the processing server 102 may process the payment transaction itself.

The processing server 102 may, as discussed in more detail below, receive the payment transaction and identify any transaction processing rules stored in the databases 106 corresponding to the payment transaction. The processing server 102 may identify a processing rule including the merchant identifier associated with the merchant 112 and included in the authorization request and/or transaction data, and the consumer identifier associated with the consumer 108 also included in the authorization request and/or transaction data. As a result, the processing server 102 may identify the processed transaction as one where the consumer 108 may have redeemed the selected offer. The processing server 102 may accordingly transmit transaction data for the payment transaction to the offer provider 104.

In some instances, the processing server 102 may be configured to filter the transaction data prior to transmission to the offer provider 104. Methods and systems for filtering data will be apparent to persons having skill in the relevant art. The processing server 102 may filter the transaction data for security purposes, for the privacy of the consumer 108, for removal of data that is not needed by the offer provider 104, etc. In some embodiments, the processing server may store one or more filtering rules in the databases 106 associated with each transaction processing rule such that the corresponding filtering rule or rules may be applied to each transaction identified via a transaction processing rule.

The use of transaction processing rules to identify transactions between a payment card 110 and a merchant 112 linked to the payment card 110 may enable the processing server 102 to identify only those transactions that may be relevant to a particular selected offer for transmission to the offer provider 104. This may be both more efficient, and more secure, than traditional systems, where all transactions involving either the consumer 108 or the merchant 112 may be transmitted to the offer provider 104. In addition, the offer provider 104 may notify the processing server 102 when it has identified successful redemption of the offer by the consumer 108. In such an instance, the processing server 102 may remove the transaction processing rule, and thus stop forwarding corresponding transaction data to the offer provider.

Processing Device

Figure 2:
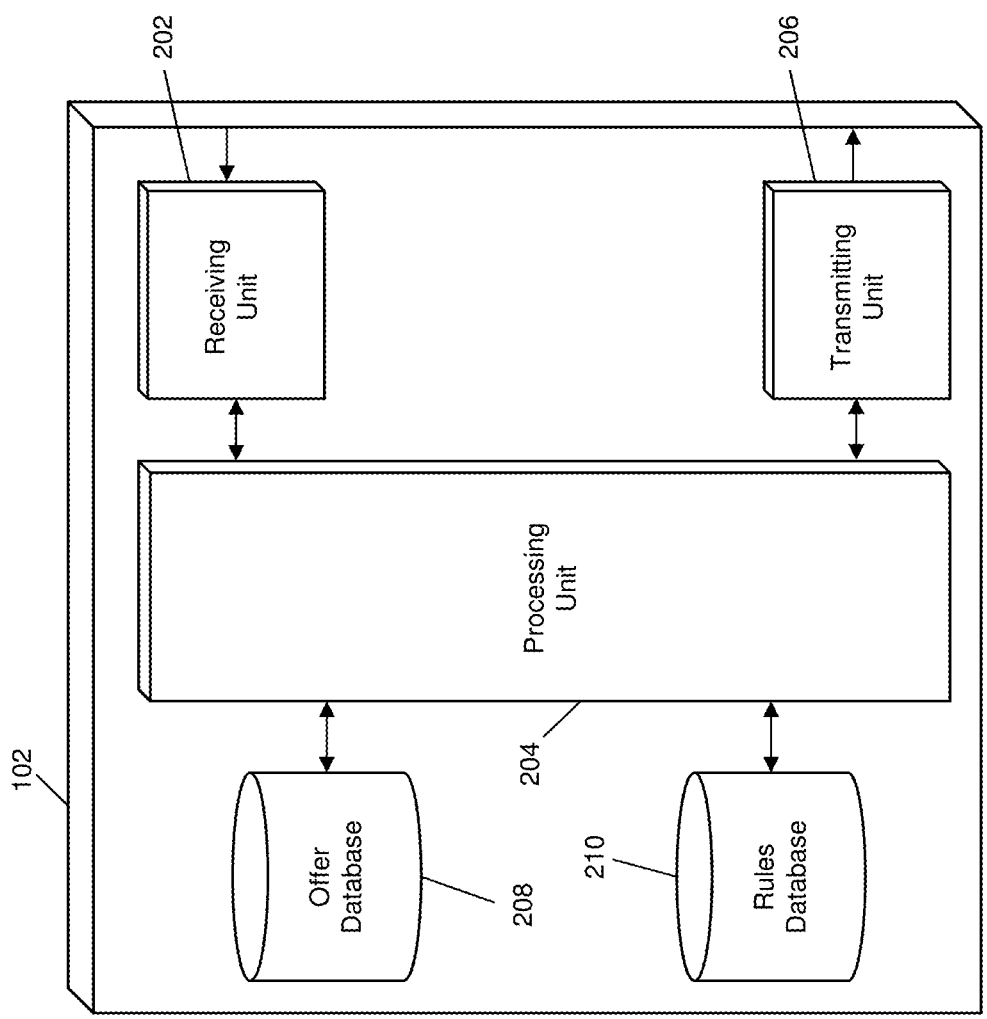
FIG. 2 is a block diagram illustrating the processing server of FIG. 1 for identification of payment transactions indicative of offer redemption and the filtering and distribution thereof in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1000 illustrated in FIG. 10 and discussed in more detail below may be a suitable configuration of the processing server 102.

The processing server 102 may include a receiving unit 202. The receiving unit 202 may be configured to receive data over one or more networks via one or more network protocols. The receiving unit 202 may receive offer linking notifications, offer listings, and/or merchant offer entries from the offer provider 104 and transaction data and/or authorization requests from the payment network 114.

The processing server 102 may also include a processing unit 204. The processing unit 204 may be configured to receive the merchant offer entry or entries from the offer provider 104 and store them in an offer database 208. Each merchant offer entry may include at least an offer identifier and an indication of a valid merchant with which the corresponding offer may be redeemed. The offer identifier may be a unique value associated with the corresponding offer, such as an identification number. The indication of a valid merchant may be a merchant identifier. As discussed in more detail below, the merchant identifier may be a unique value associated with one or more merchants and/or one or more locations of a particular merchant.

The processing unit 204 may also be configured to generate transaction processing rules based on offer linking notifications. When the receiving unit 202 has received an offer linking notification, the processing unit 204 may identify a corresponding merchant offer entry in the offer database 208. The processing unit 204 may then identify the merchant identifier included in the merchant offer entry and a consumer identifier, discussed in more detail below, included in the offer linking notification. The processing unit 204 may then generate a corresponding transaction processing rule, discussed in more detail below, which may be stored in a rules database 210.

The processing unit 204 may be further configured to identify a transaction processing rule that may correspond to receive payment transaction data. The processing unit 204 may identify a corresponding transaction processing rule based on a common merchant identifier and consumer identifier included in each of the transaction processing rule in the rules database 210 and the received transaction data. The processing unit 204 may also be configured to filter the received transaction data based on one or more filtering rules.

The processing server 102 may also include a transmitting unit 206. The transmitting unit 206 may be configured to transmit the received (e.g., and filtered) transaction data to the offer provider 104 based on the transaction processing rule. The transmitting unit 206 may be configured to transmit the data over one or more networks via one or more network protocols.

In some embodiments, the receiving unit 202 may be further configured to receive a notification from the offer provider 104 indicating the redemption of an offer by the consumer 108. The processing unit 204 may identify the transaction processing rule corresponding to the redeemed offer and may remove or otherwise render inactive the transaction processing rule in the rules database 210. In some instances, each transaction processing rule may include the associated offer identifier, such as for easier identification or for distinction if the consumer 108 has received multiple offers for a single merchant 112.

Transaction Processing Rules

Figure 3:
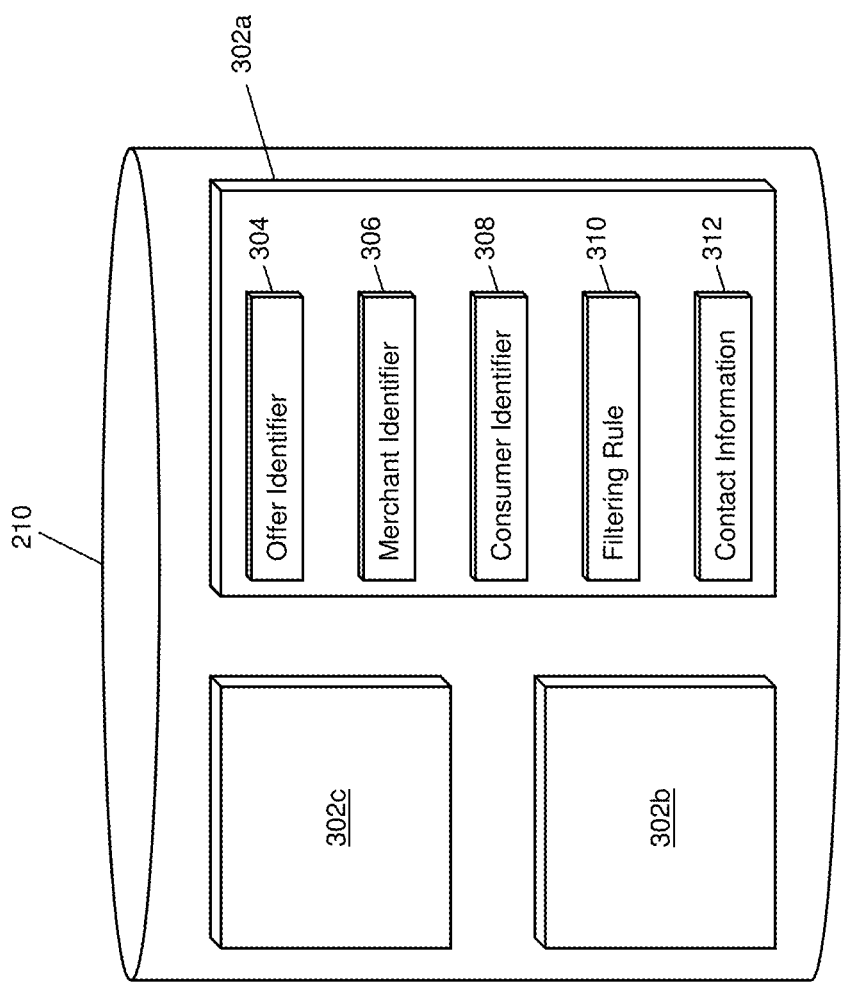
FIG. 3 is a block diagram illustrating a rules database of the processing server of FIG. 2 for the storing of transaction processing rules in accordance with exemplary embodiments.

FIG. 3 illustrates the rules database 210. The rules database 210 may be configured to store a plurality of transaction processing rules 302, illustrated in FIG. 3 as transaction processing rules 302a, 302b, and 302c. Each transaction processing rule 302 may include an offer identifier 304, a merchant identifier 306, and a consumer identifier 308. In some embodiments, a transaction processing rule 302 may further include a filtering rule 310 and/or contact information 312.

The offer identifier 304 may be a unique value corresponding to an offer for the purchase of goods or services. The offer identifier 304 may be an identification number, a universal product code, a serial number, or any other suitable value that will be apparent to persons having skill in the relevant art. The offer identifier 304 may also correspond to an offer identifier 304 included in a merchant offer entry stored in the offer database 208.

The merchant identifier 306 may be a unique value associated with a merchant (e.g., the merchant 112). The merchant identifier 306 may be a merchant identification number (MID), an aggregate merchant identifier, a location identifier, or a combination thereof. An aggregate merchant identifier, discussed in more detail below with respect to FIG. 5, may correspond to multiple locations for a single merchant 112. In such an instance, the aggregate merchant identifier may be used as the merchant identifier 306 and be mapped (e.g., associated with) a plurality of other merchant identifiers such that a transaction between the merchant 112 and the consumer 108 at any of the corresponding merchant locations would be trigger the transaction processing rule 302.

The consumer identifier 308 may be a unique value associated with the consumer 108. In an exemplary embodiment, the consumer identifier 308 may be a payment card number of the payment card 110 or a payment account number associated with the payment account corresponding to the payment card 110. In other embodiments, the consumer identifier 308 may be a phone number, name, e-mail address, street address, or any other suitable value that will be apparent to persons having skill in the relevant art.

The filtering rule 310 may be one or more rules for the filtering of transaction data prior to transmission of transaction data for an identified payment transaction to the offer provider 104. The filtering rule 310 may indicate one or more data fields in an authorization request or otherwise indicate data that is to be filtered out and/or included in the transmission to the offer provider 104. For example, the filtering rule 310 may indicate that the transaction amount for the transaction be removed from the transaction data prior to its distribution. Each filtering rule 310 may be set by the consumer 108 associated with the consumer identifier 308, the merchant 112 associated with the merchant identifier 306, the offer provider 104, the payment network 114, the processing server 102, and/or a third party (e.g., an issuing bank associated with the payment card 110). Methods and systems for the use of filtering rules 310 to filter data prior to distribution will be apparent to persons having skill in the relevant art.

The contact information 312 may be used by the processing server 102 to identify the offer provider 104. For example, the contact information 312 may be an identifier associated with the offer provider 104, a method of communication, a communication address, or combination thereof. In one example, the contact information 312 may be an Internet protocol (IP) address associated with the offer provider 104. In such an example, the processing server 102 may transmit (e.g., over the Internet) the transaction data for a payment transaction associated with the transaction processing rule 302 to the IP address included in the contact information 312.

Receipt and Storage of Merchant Offer Entries

Figure 4:
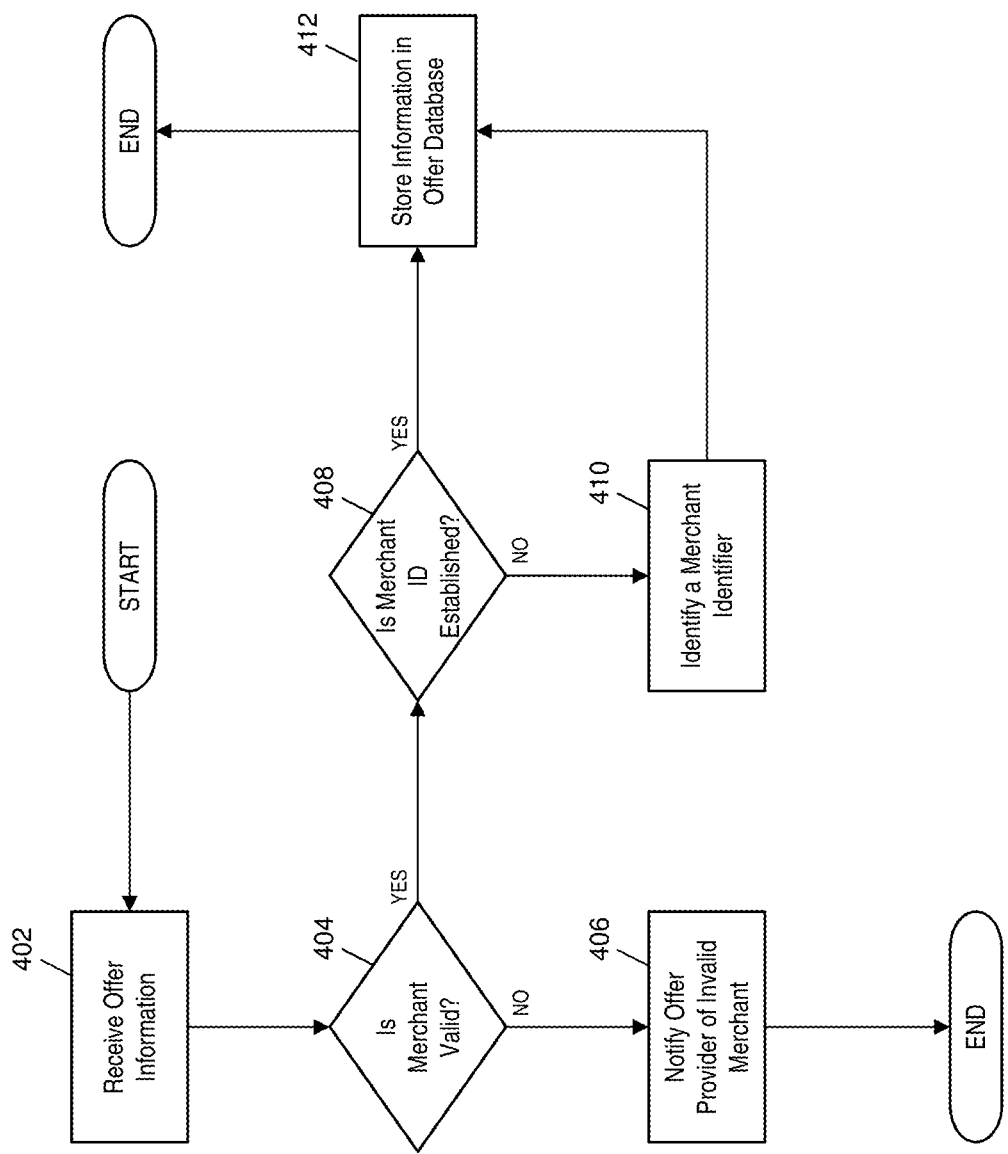
FIG. 4 is a flow chart illustrating the receipt and storage of merchant information related to an offer in accordance with exemplary embodiments.

FIG. 4 illustrates a method for the receipt and storage of merchant offer entries by the processing server 102.

In step 402, the processing server 102 may receive offer information from the offer provider for an offer for the purchase of goods and/or services. The offer information may include at least an offer identifier 304 and an indication of a merchant 112 with whom the related offer may be redeemed. The indication of the merchant 112 may be a merchant identifier 306 associated with the merchant 112 or other value associated with the merchant 112.

In step 404, the processing unit 204 may determine if the indicated merchant 112 is a valid merchant. In some embodiments, the merchant 112 may be considered a valid merchant if the merchant 112 is enrolled in a program or service such that the processing server 102 may be able to identify payment transactions involving the merchant 112 as being indicative of offer redemption. For example, the merchant 112 may be invalid if transactions submitted by the merchant 112 (e.g., via an acquirer associated with the merchant 112) to the payment network 114 do not include the consumer identifier 308 or other identifying information. Methods and systems for identifying a valid merchant will be apparent to persons having skill in the relevant art.

If the merchant 112 is not valid, then, in step 406, the transmitting unit 206 of the processing server 102 may transmit a notification to the offer provider indicating that the merchant 112 is not valid. The process may then be finished, and the processing server 102 may await additional offer data from the offer provider 104. If, on the other hand, the merchant 112 is a valid merchant, then, in step 408, the processing unit 408 may identify if a merchant identifier 306 has been established for the indicated merchant 112.

In instances where the associated offer may be redeemed at a plurality of merchant locations (e.g., points-of-sale), such as at several separate physical locations and via a webpage, the processing server 102 may establish an aggregate merchant identifier 306 associated with identifiers corresponding to each of the plurality of locations. The use of an aggregate merchant identifier 306 is discussed in more detail below. If the processing server 102 determines that no merchant identifier 306 has been established for the merchant 112 with whom the offer may be redeemed, the processing unit 204 may identify a suitable merchant identifier 306, in step 410.

Once a merchant identifier 306 has been established, then, in step 412, the processing unit 204 may store the offer data including the merchant identifier 306 and the offer identifier 304 as a merchant offer data entry in the offer database 208. The merchant offer data entry may also include additional data as included in the offer data originally provided by the offer provider 104.

Aggregate Merchant Identifiers

Figure 5:
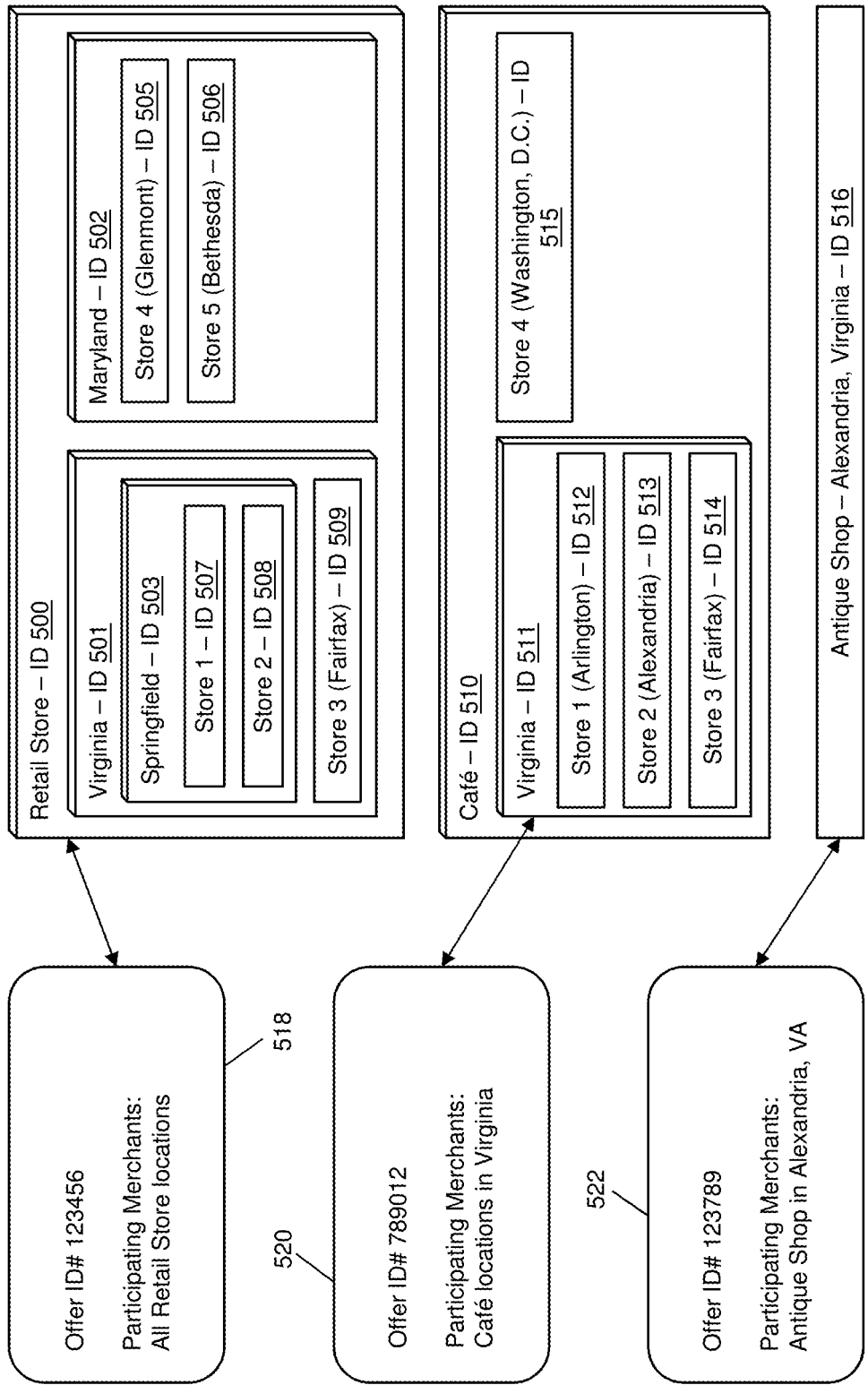
FIG. 5 is a diagram illustrating the identification of aggregate merchant identifiers for use in merchant identification in accordance with exemplary embodiments.

FIG. 5 illustrates the identification of merchant identifiers 306 including aggregate merchant identifiers associated with a plurality of merchant locations.

A merchant 112, named Retail Store, may have a plurality of stores located in a plurality of locations. As illustrated in FIG. 5, Retail Store may have two stores located in Springfield, Va., a store in Fairfax, Va., a store in Glenmont, Md., and a store in Bethesda, Md. The processing server 102 may assign a merchant identifier 306 to each of the locations of Retail Store, such as the merchant identifiers 505-509.

The processing server 102 may also establish aggregate merchant identifiers to represent multiple merchant locations. As illustrated in FIG. 5, the processing server 102 may establish an aggregate merchant identifier for each city, such as merchant identifier 503 representing both stores in Springfield. Aggregate merchant identifiers may also be established for each state, such as merchant identifiers 501 and 502 being associated with each store located in Virginia and Maryland, respectively. The processing server 102 may also establish a merchant identifier 500, which may be associated with all locations of Retail Store.

The use of the aggregate merchant identifiers may enable the processing server 102 to quickly identify a transaction to be distributed to the offer provider 104 without having to monitor for multiple merchant identifiers. In instances where an offer may be redeemed at a merchant with hundreds or thousands of locations nation- or even worldwide, the use of an aggregate merchant identifier may vastly increase processing speed and efficiency.

As an example, the processing server 102 may receive an offer 518 from the offer provider 104 for storage in the offer database 208. The offer 518 may include an offer identifier 304, illustrated in FIG. 5 as the value "123456," and may be redeemed at all locations of Retail Store. Accordingly, the processing unit 204 may identify merchant identifier 500, which is associated with every location of Retail Store, to be included in the merchant offer entry to be stored in the offer database 208.

In the examples illustrated in FIG. 5, the processing server 102 may also receive offers 520 and 522 from the offer provider 104. The offer 520 may be eligible for redemption at the Café locations in Virginia, but not locations in other areas, such as one location in Washington, D.C. The processing unit 204 may accordingly identify merchant identifier 511 to be included in the corresponding merchant offer entry, as the merchant identifier 511 corresponds to all Café locations in Virginia. The use of the single merchant identifier 511 may result in increased performance rather than the use of three separate merchant identifiers 512, 513, and 514.

The offer 522 may be eligible for redemption at Antique Shop located in Alexandria, Va. Antique Shop may be a merchant 112 with a single location, which may be associated with merchant identifier 516. Because Antique Shop has a single location, the processing unit 204 may use the merchant identifier 516 associated with the single location without identifying an aggregate merchant identifier for the offer 522.

Although it is illustrated in FIG. 5 that aggregate merchant identifiers may be identified and aggregated based on geographic location, it will be apparent to persons having skill in the relevant art that merchant identifiers may be aggregated based on additional, or alternative, criteria. For example, an aggregate merchant identifier may be used to correspond to all participating locations of a merchant 112 who will redeem a specific offer, without regard to geographic location. In another example, an aggregate merchant identifier may be established representing only new stores for the merchant 112. In some instances, merchant levels may be assigned to merchants 112 and/or merchant locations, such as merchant levels for city, state, and country locations. In such an instance, the offer information may include a merchant level. Additional criteria for establishing aggregate merchant identifiers may include acquirer identifiers, acquirer-assigned identifiers, location owners, location managers, and any other suitable criteria that will be apparent to persons having skill in the relevant art.

Generation of Transaction Processing Rules

Figure 6:
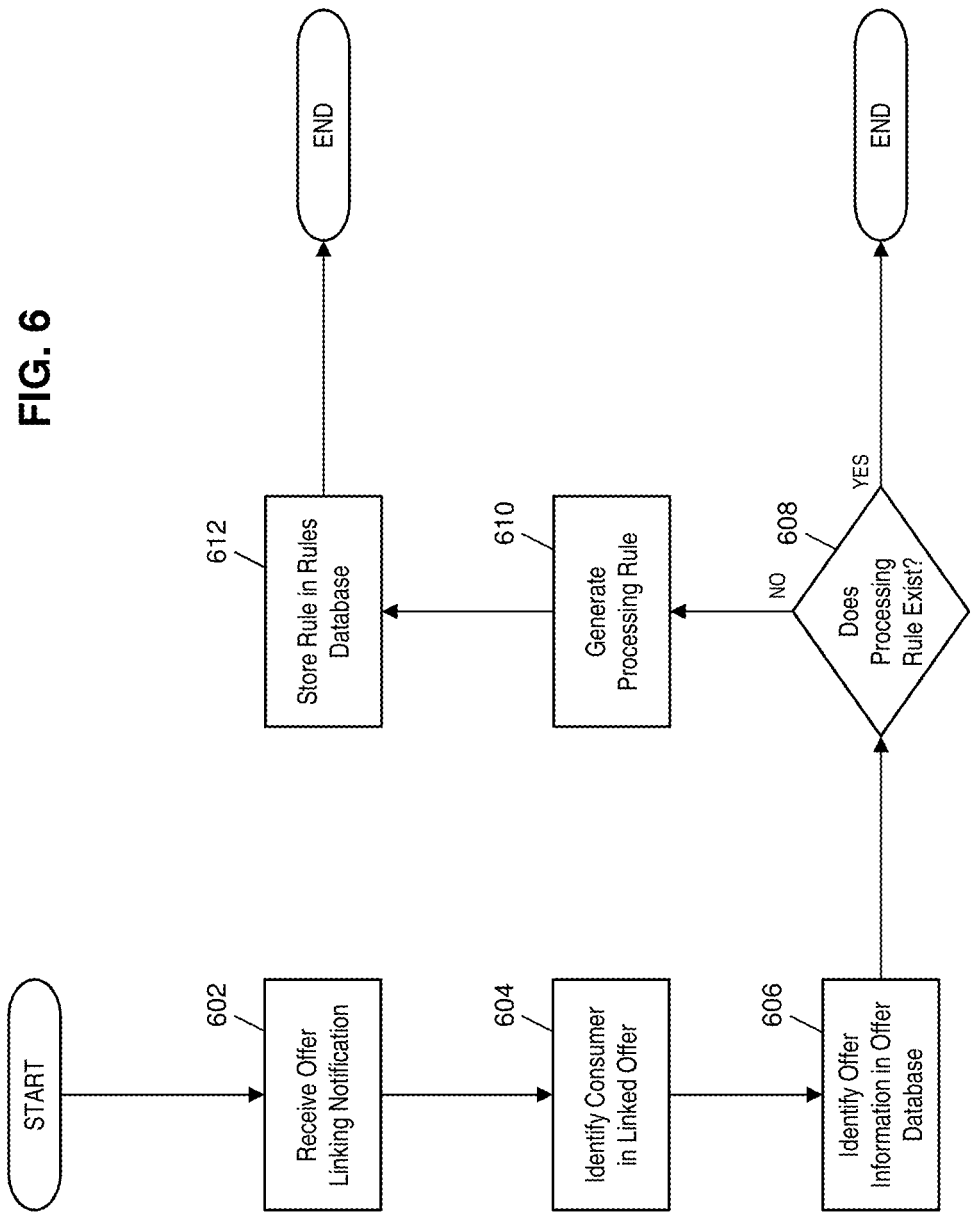
FIG. 6 is a flow chart illustrating the linking of payment cards to offers and generation of processing rules thereof in accordance with exemplary embodiments.

FIG. 6 illustrates a method for the generation and storing of transaction processing rules for identifying payment transactions indicative of offer redemption.

In step 602, the processing server 102 may receive an offer linking notification from the offer provider 104. The offer linking notification may include at least a consumer identifier 308 associated with the consumer 108 that has selected the related offer, and an indication of a selection of an offer, such as an offer identifier 304. In step 604, the processing unit 204 may identify the consumer identifier 308 included in the offer linking notification. In some instances, the offer linking notification may include an indication of the consumer 108 (e.g., an e-mail address) and the processing unit 204 may identify a corresponding consumer identifier 308 (e.g., a payment card number).

In step 606, the processing unit 204 may identify offer information corresponding to the selected offer in the offer database 208. The processing unit 204 may identify the offer information by identifying a merchant offer entry including the indication included in the received offer linking notification. In step 608, the processing unit 204 may determine if a transaction processing rule for the received offer linking notification already exists. If a rule already exists, then the process may be completed. In one embodiment, the processing server 102 may transmit a notification to the offer provider 104 indicating that a processing rule already exists. In some instances, such an embodiment may occur when the consumer 108 already has an outstanding offer with the merchant 112.

If a transaction processing rule corresponding to the received offer linking notification does not exist, then, in step 610, the processing unit 204 may generate a new transaction processing rule 302. In some embodiments, generating the transaction processing rule 302 may include identifying an aggregate merchant identifier. The transaction processing rule 302 may include at least the merchant identifier 306 and the consumer identifier 308. In step 612, the processing unit 204 may store the generated transaction processing rule 302 in the rules database 210.

In some embodiments, the transaction processing rule 302 may include one or more filtering rules 310. In some instances, a filtering rule 310 may be included in the offer linking notification. In other instances, a filtering rule 310 may be included in the identified merchant offer entry. In another instance, a filtering rule 310 may be associated with the merchant 112 and/or the merchant identifier 306 to be included in any corresponding transaction processing rule 302. Additional methods for identifying a filtering rule 310 to include in the transaction processing rule 302 will be apparent to persons having skill in the relevant art.

Distributing Transaction Details Indicative of Offer Redemption

Figure 7:
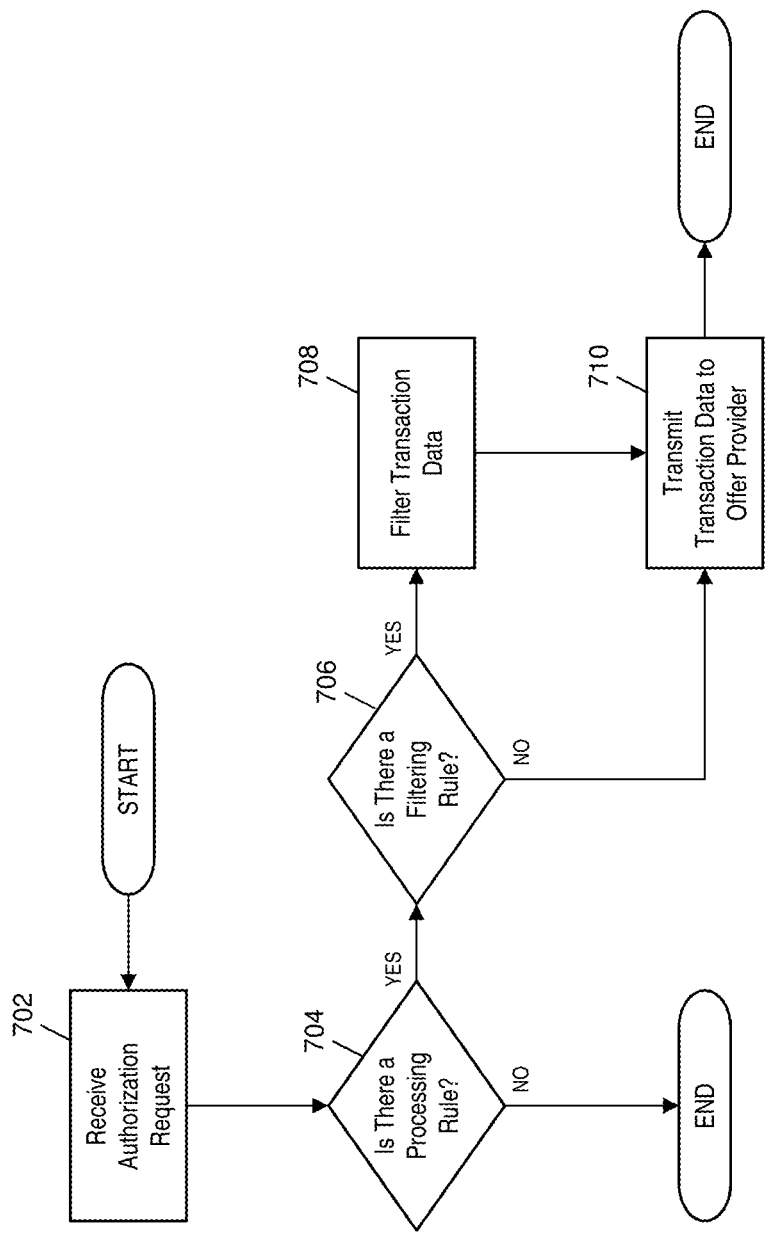
FIG. 7 is a flow chart illustrating the filtering and distribution of transaction data based on transaction processing rules in accordance with exemplary embodiments.

FIG. 7 illustrates a method for the filtering and distribution of transaction details for a payment transaction pursuant to a transaction processing rule 302, such as a transaction processing rule 302 generated and stored in the rules database 210 via the process illustrated in FIG. 6.

In step 702, the processing server 102 may receive an authorization request from the payment network 114 for a payment transaction involving the merchant 112 and the consumer 108. In some embodiments, the processing server 102 may only receive transaction data included in the authorization request. In a further embodiment, the received transaction data may be filtered by the payment network 114 prior to transmission to the processing server 102. The transaction data received by the processing server 102 may include at least a merchant identifier 306 and a consumer identifier 308.

In step 704, the processing unit 204 may examine the transaction processing rules 302 in the rules database 210 to determine if a transaction processing rule 302 applies to the corresponding payment transaction. A transaction processing rule 302 may apply to the payment transaction of the transaction processing rule 302 includes the merchant identifier 306 and consumer identifier 308 included in the received transaction details. If no transaction processing rule 302 applies, then the process may be completed.

If a transaction processing rule 302 is found to apply, then, in step 706, the processing unit 204 may further determine if a filtering rule 310 exists. The processing server 102 may identify one or more filtering rules 310 included in the transaction processing rule 302 that applies to the payment transaction. In some instances, the processing unit 204 may identify filtering rules 310 included in a corresponding merchant offer entry, associated with the merchant identifier 306, associated with the consumer identifier 308, etc. If a filtering rule 310 is found, then, in step 708, the processing unit 204 may filter the received transaction data (e.g., to remove confidential or private information, etc.). Methods and systems for filtering transaction data based on one or more filtering rules 310 will be apparent to persons having skill in the relevant art.

Once the transaction data has been filtered, or if there is no filtering rule 310 to apply to the transaction data, then, in step 710, the transmitting unit 206 of the processing server 102 may transmit the transaction data to the offer provider 104. In embodiments where the transaction processing rule 302 may include contact information 312, the transmitting unit 206 may transmit the transaction data to the offer provider 104 based on the included contact information 312.

In some embodiments, transactions may also be scored as a result of a transaction processing rule 302 and/or a filtering rule 310. The scoring of a transaction may be performed by the processing unit 204 to generate a score for the payment transaction that may represent, for example, the likelihood that the payment transaction is one in which the consumer 108 redeemed the selected offer with the merchant 112. The score for the transaction may be based on the transaction amount, transaction time and/or date, product data, or any other suitable information. In some instances, criteria for scoring the transaction may be provided by the offer provider 104. In one embodiment, the processing server 102 may not transmit the transaction details for a payment transaction unless the generated score is above a predetermined threshold (e.g., as provided by the offer provider 104 or set by the processing server 102).

For example, the consumer 108 may select an offer for $10 off of $25 spent at the merchant 112, and the processing server 102 may store a corresponding transaction processing rule 302 in the rules database 210. The processing server 102 may receive transaction details for a payment transaction involving the consumer 108 and the merchant 112 in which the transaction amount is $12.42. The processing unit 204 may generate a score for the transaction that is below the predetermined threshold, as it is unlikely that the consumer 108 redeemed the offer since the transaction amount is below $15 (e.g., $10 off by using the offer from $25 spent as required for redemption). Accordingly, the processing server 102 may not transmit the transaction details to the offer provider 104. The use of scoring to further limit the transaction details provided to the offer provider 104 may further increase both efficiency and security as less transactions, and thus less consumer and merchant information, may be provided to the offer provider 104.

Figure 8:
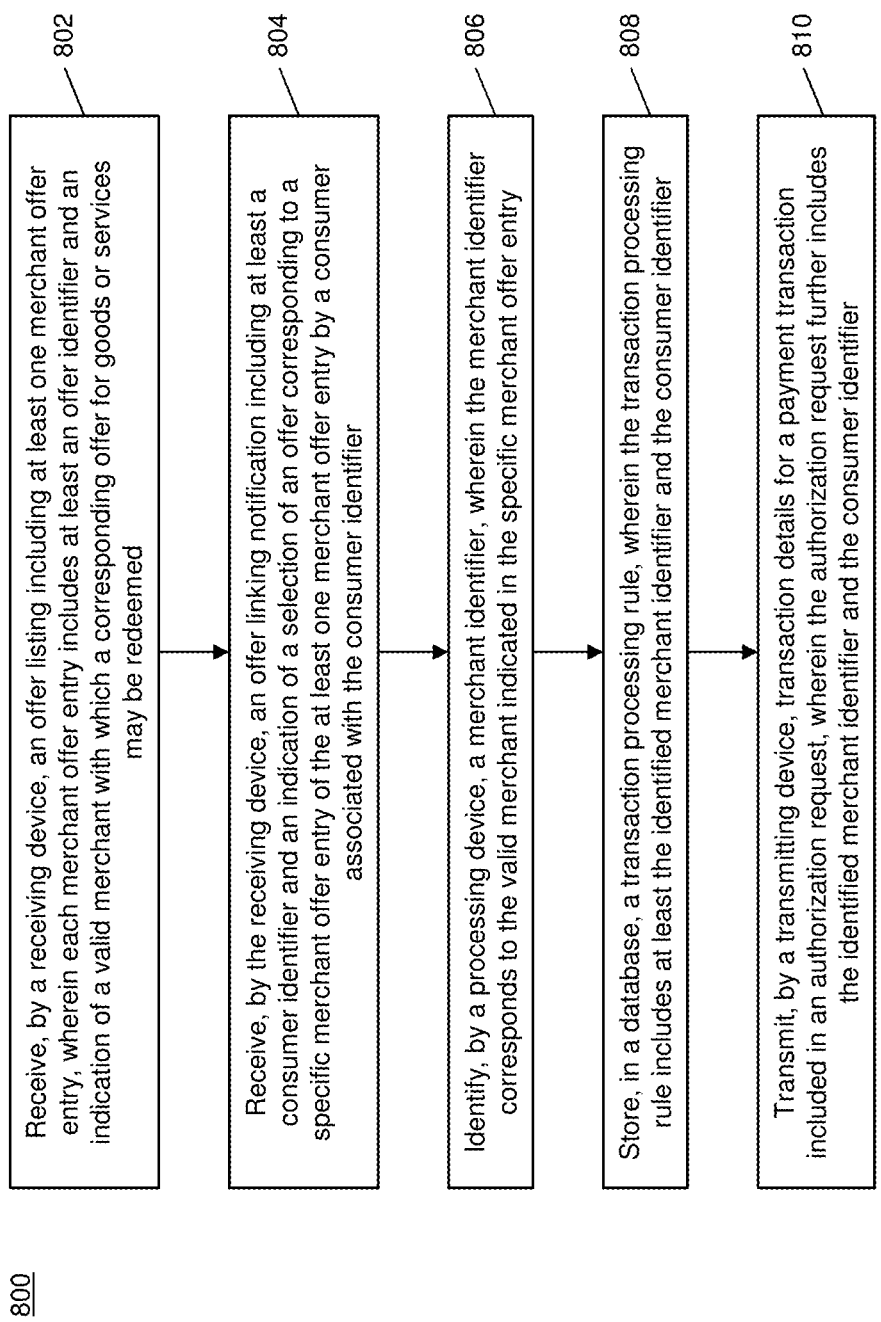
FIGS. 8 and 9 are flow charts illustrating exemplary methods for providing transaction details for payment transactions indicative of offer redemption in accordance with exemplary embodiments.

First Exemplary Method for Providing Transaction Details for Payment Transactions Indicative of Offer Redemption FIG. 8 illustrates a method 800 for the providing of transaction details for payment transactions involving a consumer (e.g., the consumer 108) and a merchant (e.g., the merchant 112) indicative of offer redemption based on payment card link transaction filtering.

In step 802, an offer listing including at least one merchant offer entry may be received, by a receiving device (e.g., the receiving unit 202), wherein each merchant offer entry may include at least an offer identifier (e.g., the offer identifier 304) and an indication of a valid merchant (e.g., the merchant 112) with which a corresponding offer for goods or services may be redeemed.

In step 804, an offer linking notification may be received, by the receiving device 202, wherein the offer linking notification may include at least a consumer identifier (e.g., the consumer identifier 308) and an indication of a selection of an offer corresponding to a specific merchant offer entry of the at least one merchant offer entry by a consumer 108 associated with the consumer identifier 308. In one embodiment, the consumer identifier 308 may correspond to a payment card (e.g., the payment card 110) associated with the consumer 108 and used to fund the payment transaction.

In step 806, a merchant identifier (e.g., the merchant identifier 306) may be identified, by a processing device (e.g., the processing unit 204), wherein the merchant identifier 306 corresponds to the valid merchant 112 indicated in the specific merchant offer entry. In one embodiment, the merchant identifier 308 may include at least one of: an aggregate merchant identifier, a location identifier, an acquirer identifier, a merchant doing business as name, and an authorization acquiring identifier. In a further embodiment, each merchant offer entry may further include a merchant level, and the merchant identifier 308 may be based on the merchant level included in the specific merchant offer entry.

In step 808, a transaction processing rule (e.g., the transaction processing rule 302) may be stored, in a database (e.g., the rules database 210), wherein the transaction processing rule 302 includes at least the identified merchant identifier 306 and the consumer identifier 308.

In step 810, transaction details for a payment transaction included in an authorization request may be transmitted, by a transmitting device (e.g., the transmitting unit 206), wherein the authorization request further includes the identified merchant identifier 306 and the consumer identifier 308. In one embodiment, the offer listing may be received from an offer provider (e.g., the offer provider 104), and the transaction details may be transmitted to the offer provider 104. In some embodiments, the method 800 may further include scrubbing, by the processing device 204, the transaction details prior to transmitting to remove private and/or personal data.

In one embodiment, the method 800 may further include: receiving, by the receiving device 202, an indication of expiration of an offer corresponding to the specific merchant offer entry; and updating, in the database 210, the transaction processing rule 302 to indicate expiration of the corresponding offer. In a further embodiment, indication of the expiration of the corresponding offer may include removal of the transaction processing rule 302 from the rules database 210. In another embodiment, each merchant offer entry may include a predetermined period of time, and the method 800 may further include updating, in the database 210, the transaction processing rule 302 to indicate the expiration of the corresponding offer after the predetermined period of time included in the specific merchant offer entry.

Figure 9:
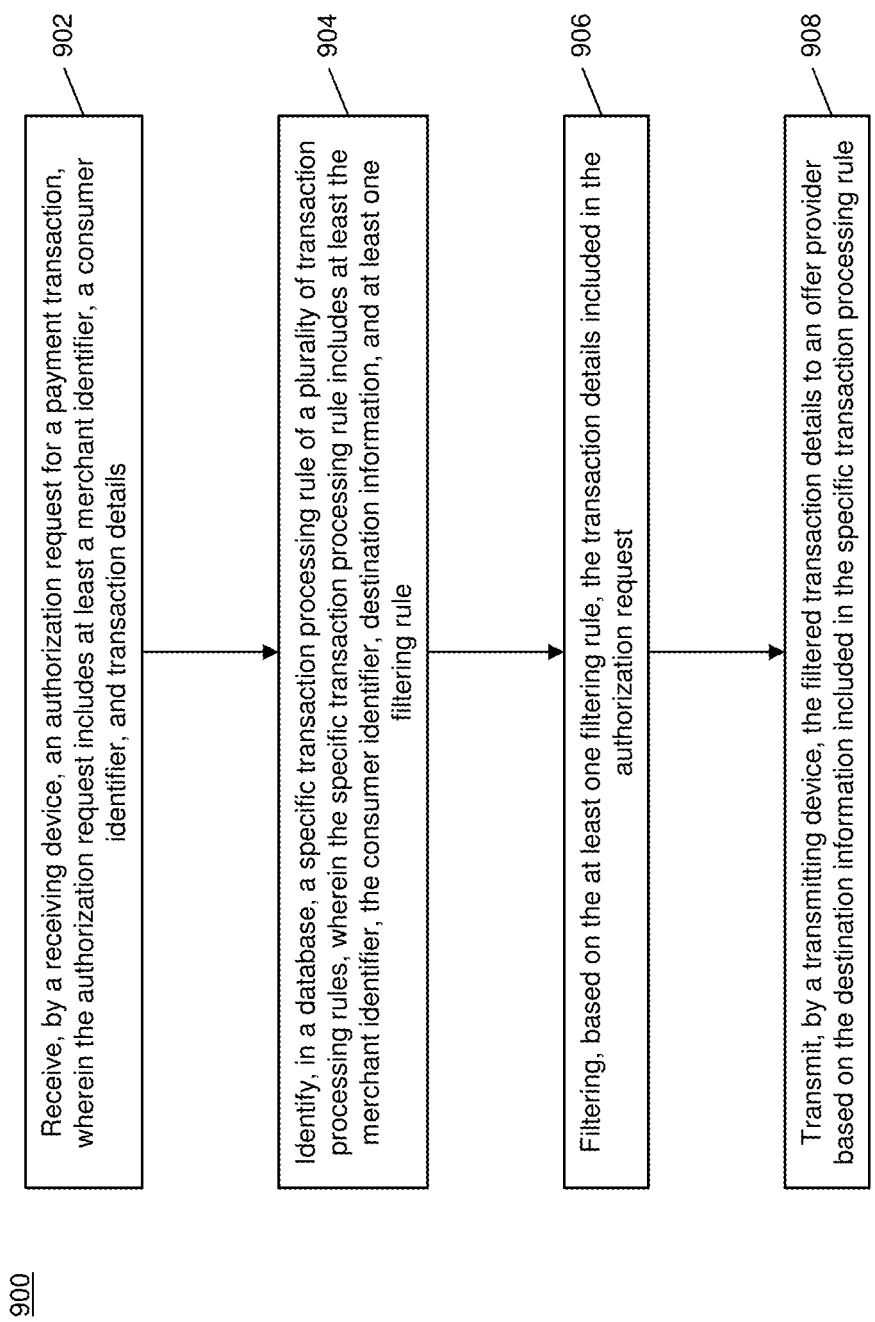

Second Exemplary Method for Providing Transaction Details for Payment Transactions Indicative of Offer Redemption FIG. 9 illustrates a method 900 for the providing of filtered transaction details for payment transactions involving a consumer (e.g., the consumer 108) and a merchant (e.g., the merchant 112) indicative of offer redemption based on payment card link transaction filtering.

In step 902, an authorization request for a payment transaction may be received, by a receiving device (e.g., the receiving unit 202), wherein the authorization request includes at least a merchant identifier (e.g., the merchant identifier 306), a consumer identifier (e.g., the consumer identifier 308), and transaction details. In one embodiment, the merchant identifier 306 may include at least one of: an aggregate merchant identifier, a location identifier, an acquirer identifier, a merchant doing business as name, and an authorization requiring identifier.

In step 904, a specific transaction processing rule (e.g., the transaction processing rule 302) of a plurality of transaction processing rules may be identified, in a database (e.g., the rules database 210), wherein the specific transaction processing rule 302 includes at least the merchant identifier 306, the consumer identifier 308, destination information (e.g., the contact information 312), and at least one filtering rule (e.g., filtering rule 310). In one embodiment, each transaction processing rule 302 may correspond to an offer for the purchase of goods or services.

In step 906, the transaction details included in the authorization request may be filtered based on the at least one filtering rule 310. In step 908, the filtered transaction details may be transmitted, by a transmitting device (e.g., the transmitting unit 206) to an offer provider (e.g., the offer provider 104) based on the destination information 312 included in the specific transaction processing rule 302.

Computer System Architecture

Figure 10:
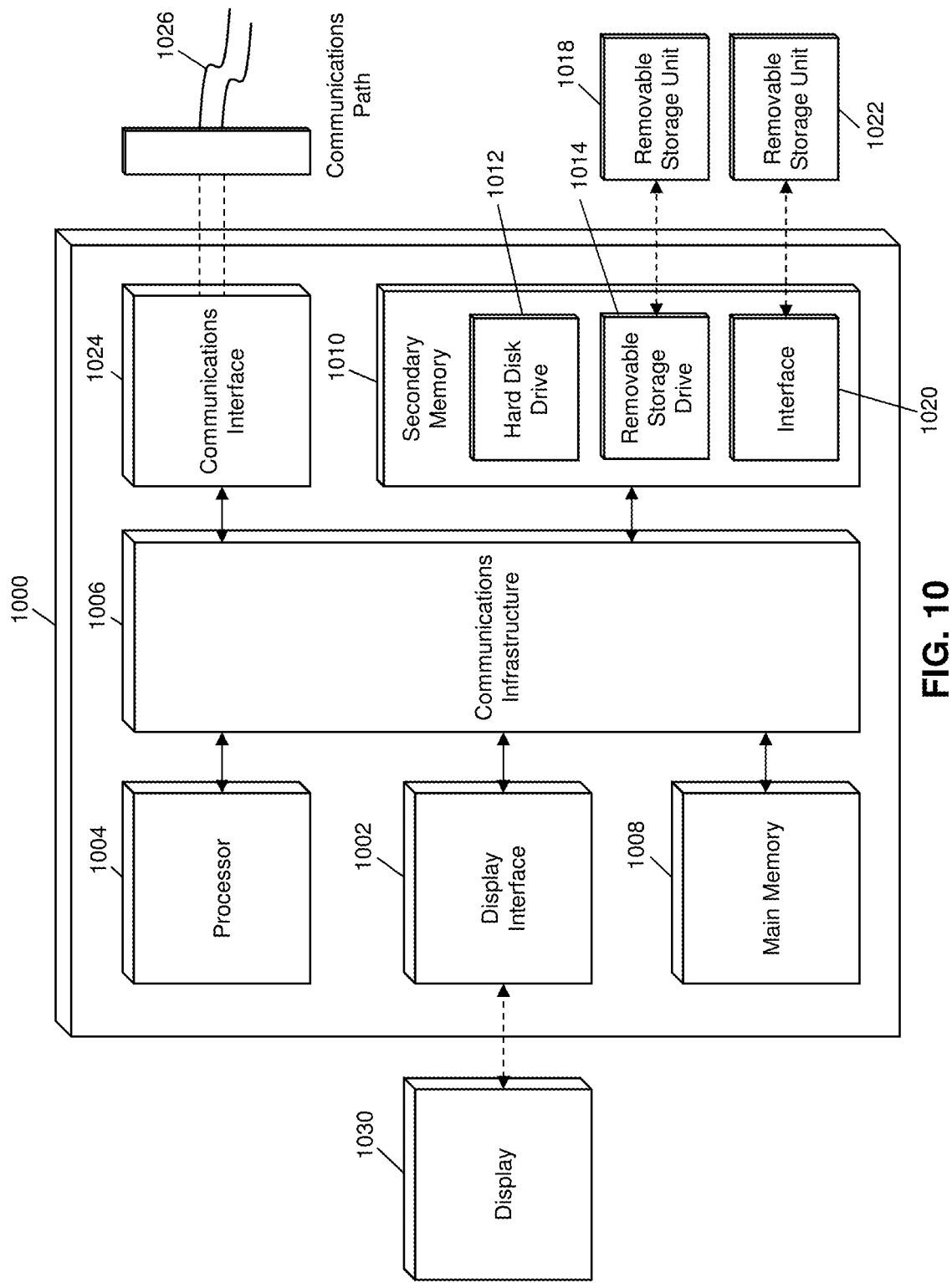
FIG. 10 is a block diagram illustrating a computer system architecture in accordance with exemplary embodiments.

FIG. 10 illustrates a computer system 1000 in which embodiments of the present disclosure, or portions thereof, may be implemented as computer-readable code. For example, the processing server 102 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4 and 6-9.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 1000. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. The processor device 1004 may be connected to a communication infrastructure 1006, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1000 may also include a main memory 1008 (e.g., random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive, the removable storage unit 1018 may be a floppy disk. In one embodiment, the removable storage unit 1018 may be non-transitory computer readable recording media.

In some embodiments, the secondary memory 1010 may include alternative means for allowing computer programs or other instructions to be loaded into the computer system 1000, for example, the removable storage unit 1022 and an interface 1020. Examples of such means may include a program cartridge and cartridge interface (e.g., as found in video game systems), a removable memory chip (e.g., EEPROM, PROM, etc.) and associated socket, and other removable storage units 1022 and interfaces 1020 as will be apparent to persons having skill in the relevant art.

Data stored in the computer system 1000 (e.g., in the main memory 1008 and/or the secondary memory 1010) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1000 may also include a communications interface 1024. The communications interface 1024 may be configured to allow software and data to be transferred between the computer system 1000 and external devices. Exemplary communications interfaces 1024 may include a modem, a network interface (e.g., an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

Computer program medium and computer usable medium may refer to memories, such as the main memory 1008 and secondary memory 1010, which may be memory semiconductors (e.g. DRAMs, etc.). These computer program products may be means for providing software to the computer system 1000. Computer programs (e.g., computer control logic) may be stored in the main memory 1008 and/or the secondary memory 1010. Computer programs may also be received via the communications interface 1024. Such computer programs, when executed, may enable computer system 1000 to implement the present methods as discussed herein. In particular, the computer programs, when executed, may enable processor device 1004 to implement the methods illustrated by FIGS. 4 and 6-9, as discussed herein. Accordingly, such computer programs may represent controllers of the computer system 1000. Where the present disclosure is implemented using software, the software may be stored in a computer program product and loaded into the computer system 1000 using the removable storage drive 1014, interface 1020, and hard disk drive 1012, or communications interface 1024.

Techniques consistent with the present disclosure provide, among other features, systems and methods for providing transaction details for payment transactions indicative of offer redemption using card link filtering. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing transaction details for payment transactions indicative of offer redemption, comprising:
receiving, by a receiving device of a processing server from an offer provider server of an offer provider, an offer listing including a plurality of merchant offer entries from a plurality of merchants, wherein each merchant offer entry includes at least an offer identifier and an indication of a valid merchant with which a corresponding offer for goods or services may be redeemed, wherein the valid merchant is enrolled in a program with the offer provider;
receiving, by the receiving device of the processing server from the offer provider server, an offer linking notification including at least a consumer identifier associated with a consumer and an indication of a selection of an offer corresponding to a specific merchant offer entry of the at least one merchant offer entry by an electronic consumer device associated with the consumer identifier, wherein the offer is purchased from the offer provider with a payment card associated with the consumer, wherein the offer linking notification: (1) includes an identification of the payment card used to purchase the offer, (2) validates the consumer identifier, and (3) corresponds to the offer corresponding to the specific merchant offer entry of the at least one merchant offer entry;

identifying, by a processing device of the processing server, a merchant identifier, wherein the merchant identifier corresponds to the valid merchant indicated in the specific merchant offer entry associated with the selected offer;

generating, by the processing device of the processing server, a transaction processing rule based on the offer linking notification received from the offer provider and on the payment card used to purchase the offer corresponding to the offer linking notification;

electronically storing, in a database of the processing server, generated transaction processing rule, wherein the transaction processing rule includes at least the identification of the payment card used to purchase the offer corresponding to the offer linking notification, the identified merchant identifier, and the consumer identifier; and transmitting, by a transmitting device of the processing server to a payment network, transaction details based on the selected offer for validating a payment transaction between the valid merchant and the payment card used to purchase the offer corresponding to the offer linking notification, wherein the payment transaction is included in an authorization request, wherein the authorization request further includes at least the identified merchant identifier corresponding to the valid merchant, the consumer identifier, and the identification of the payment card used to purchase the offer corresponding to the offer linking notification.

2. The method of claim 1, wherein the transaction details are transmitted to the offer provider server.

3. The method of claim 1, further comprising:
receiving, by the receiving device of the processing server, an indication of expiration of an offer corresponding to the specific merchant offer entry; and
updating, in the database of the processing server, the transaction processing rule to indicate the expiration of the corresponding offer.

4. The method of claim 1, wherein the merchant identifier includes at least one of:
an aggregate merchant identifier, a location identifier, an acquirer identifier, a merchant doing business as name, and an authorization acquiring identifier.

5. The method of claim 4, wherein each merchant offer entry further includes a merchant level, and wherein the identified merchant identifier is based on the merchant level included in the specific merchant offer entry.

6. The method of claim 1, wherein the payment card used to purchase the offer corresponding to the offer linking notification is used to fund the payment transaction.

7. The method of claim 1, further comprising: scrubbing, by the processing device of the processing server, the transaction details prior to transmitting to remove one or more of: private data and personal data.

8. The method of claim 1, wherein each merchant offer entry further includes a predetermined period of time, and the method further comprises: updating, in the database of the processing server, the transaction processing rule to indicate the expiration of the corresponding offer after the predetermined period of time included in the specific merchant offer entry.

9. A system for providing transaction details for payment transactions indicative of offer redemption, comprising:
a database, of a processing server;
a receiving device, of the processing server, configured to:
receive, from an offer provider server of an offer provider, an offer listing including a plurality of merchant offer entries from a plurality of merchants, wherein each merchant offer entry includes at least an offer identifier and an indication of a valid merchant with which a corresponding offer for goods or services may be redeemed, wherein the valid merchant is enrolled in a program with the offer provider, and
receive, from the offer provider server, an offer linking notification including at least a consumer identifier associated with a consumer and an indication of a selection of an offer corresponding to a specific merchant offer entry of the at least one merchant offer entry by an electronic consumer device associated with the consumer identifier, wherein the offer is purchased from the offer provider with a payment card associated with the consumer, wherein the offer linking notification: (1) includes an identification of the payment card used to purchase the offer, (2) validates the consumer identifier, and (3) corresponds to the offer corresponding to the specific merchant offer entry of the at least one merchant offer entry;

a processing device of the processing server configured to:
identify a merchant identifier, wherein the merchant identifier corresponds to the valid merchant indicated in the specific merchant offer entry associated with the selected offer,
generate a transaction processing rule based on the offer linking notification received from the offer provider and on the payment card used to purchase the offer corresponding to the offer linking notification, and
electronically store, in the database of the processing server, the generated transaction processing rule, wherein the transaction processing rule includes at least the identification of the payment card used to purchase the offer corresponding to the offer linking notification, the identified merchant identifier, and the consumer identifier; and a transmitting device of the processing server configured to:
transmit, to a payment network, transaction details based on the selected offer for validating a payment transaction between the valid merchant and the payment card used to purchase the offer corresponding to the offer linking notification, wherein the payment transaction is included in an authorization request, wherein the authorization request further includes at least the identified merchant identifier corresponding to the valid merchant, the consumer identifier, and the identification of the payment card used to purchase the offer corresponding to the offer linking notification.

10. The system of claim 9, wherein the transmitting device is configured to transmit the transaction details to the offer provider server.

11. The system of claim 9, wherein the receiving device is further configured to receive an indication of expiration of an offer corresponding to the specific merchant offer entry, and the processing device is further configured to update, in the database, the transaction processing rule to indicate the expiration of the corresponding offer.

12. The system of claim 9, wherein the merchant identifier includes at least one of: an aggregate merchant identifier, a location identifier, an acquirer identifier, a merchant doing business as name, and an authorization acquiring identifier.

13. The system of claim 12, wherein each merchant offer entry further includes a merchant level, and wherein the identified merchant identifier is based on the merchant level included in the specific merchant offer entry.

14. The system of claim 9, wherein the payment card used to purchase the offer corresponding to the offer linking notification is used to fund the payment transaction.

15. The system of claim 9, wherein the processing device is further configured to scrub the transaction details prior to transmitting to remove one or more of: private data and personal data.

16. The system of claim 9, wherein each merchant offer entry further includes a predetermined period of time, and the processing device is further configured to update, in the database, the transaction processing rule to indicate the expiration of the corresponding offer after the predetermined period of time included in the specific merchant offer entry.

* * * * *